United States Patent [19]

Baader et al.

[11] Patent Number: 5,295,054
[45] Date of Patent: Mar. 15, 1994

[54] SMOOTH LENS AND SEALED HOUSING FOR SIGNAL LIGHT

[76] Inventors: Edward J. Baader, 232 Stephen La.;
Joseph E. Baader, 333 Holiday Dr., both of Springfield, Ohio 45505

[21] Appl. No.: 48,175

[22] Filed: Apr. 20, 1993

[51] Int. Cl.⁵ ............................................. B60Q 1/00
[52] U.S. Cl. ........................................ 362/80; 362/267; 362/363
[58] Field of Search ................. 362/61, 80, 267, 101, 362/363, 369

[56] References Cited

U.S. PATENT DOCUMENTS

| | | |
|---|---|---|
| 1,279,096 | 9/1918 | Fitzgerald . |
| 2,164,816 | 7/1939 | Harris . |
| 2,901,593 | 8/1959 | McNally ............................ 362/80 |
| 2,916,607 | 12/1959 | Bargman ........................... 362/267 |
| 3,005,089 | 10/1961 | Robbins ............................. 362/80 |
| 3,191,798 | 6/1965 | White et al. . |
| 3,355,056 | 11/1967 | Fisch . |
| 3,355,874 | 12/1967 | Paratte . |
| 3,640,424 | 2/1972 | Ando . |
| 3,942,881 | 3/1976 | Meginnis . |
| 3,968,358 | 7/1976 | Baader . |
| 4,104,867 | 8/1978 | Worsham . |
| 4,380,793 | 4/1983 | Potts .................................. 362/267 |
| 4,468,095 | 8/1984 | Meginnis . |
| 4,765,506 | 8/1988 | Fishman et al. . |
| 4,770,520 | 9/1988 | Hoogesteger . |
| 4,836,399 | 6/1989 | Zoladz . |
| 5,052,782 | 10/1991 | Myer . |

*Primary Examiner*—James C. Yeung
*Attorney, Agent, or Firm*—David H. Semmes

[57] ABSTRACT

Smooth lens and sealed housing assembly for signal light, characterized by its utility as a vehicular warming unit. A protruding fresnel lens overlaps a light housing, the latter bearing two peripheral, water tight and vapor-impermeable seals. An uppermost seal is fastener compressed between concentric projections of the lens and opposed portions of the housing; whereas, a lowermost seal is fastener compressed between an inter rim of the lens and the bottom of the housing, as well as a wall of the vehicle. This assembly presents fail-safe plural seals for the signal light against all inclement wind and weather.

2 Claims, 2 Drawing Sheets

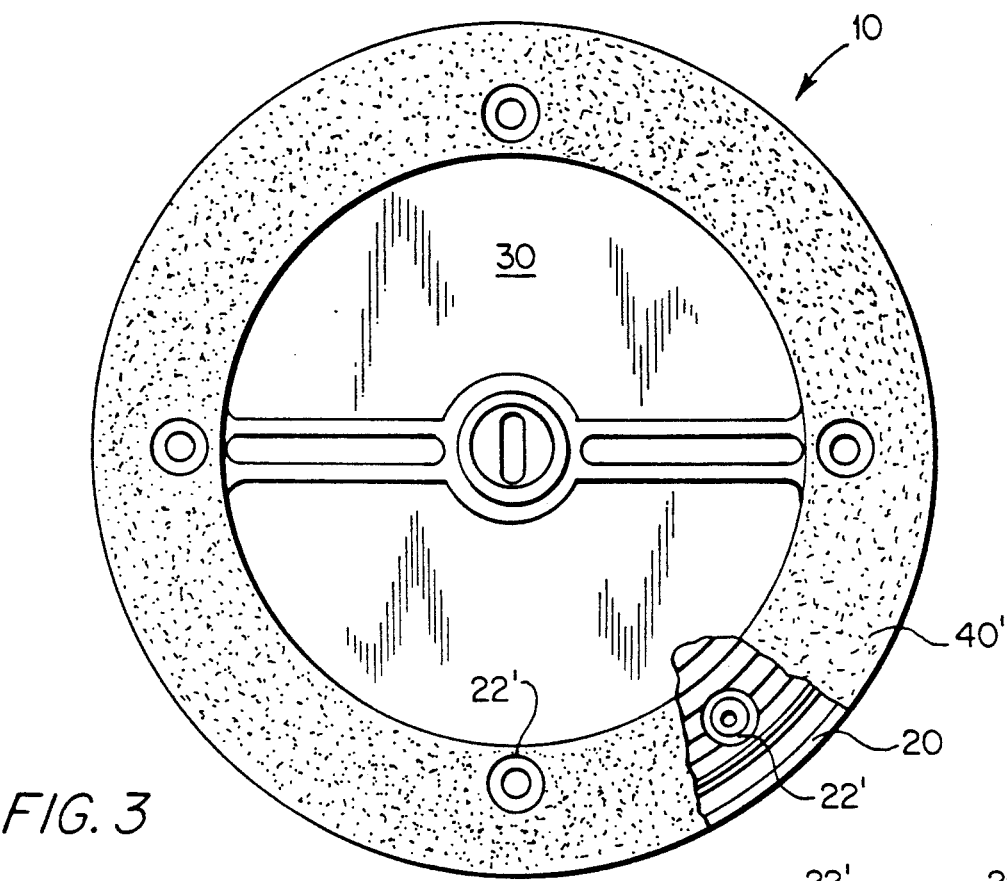
FIG. 3
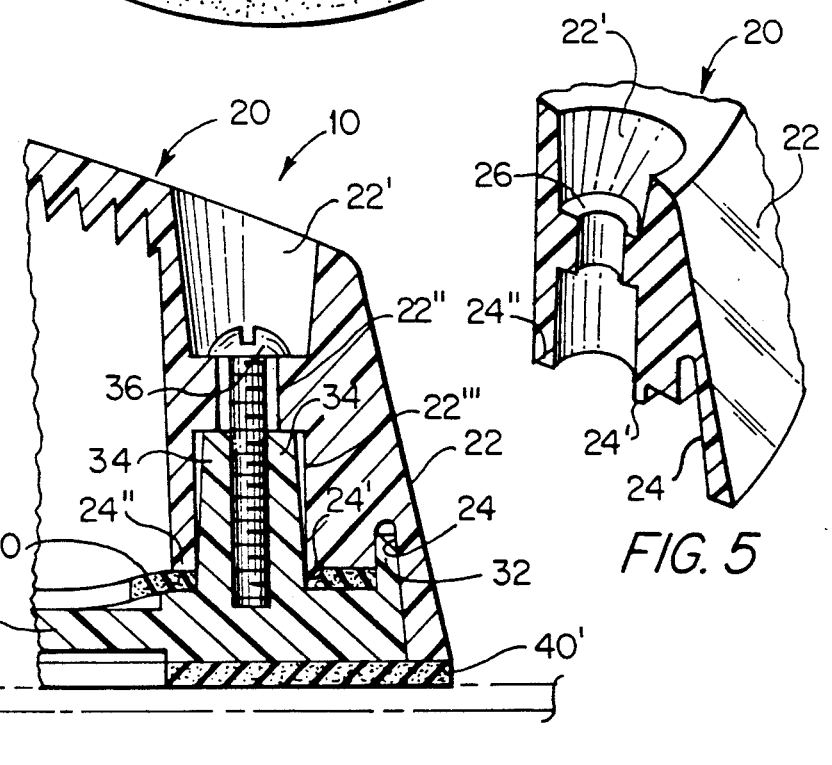
FIG. 4
FIG. 5

SMOOTH LENS AND SEALED HOUSING FOR SIGNAL LIGHT

CROSS REFERENCE TO RELATED PATENTS:

The present invention is related to U.S. Pat. No. 3,968,358 of Joseph E. Baader issued Feb. 6, 1976, entitled WARNING LIGHT ASSEMBLY.

BACKGROUND OF INVENTION

1. Field of the Invention

A warning light assembly, especially adapted for vehicular mounting, the assembly including lens, housing and sealing means interposed therebetween.

2. Description of the Prior Art

Submitted by information Disclosure Statement.

SUMMARY OF THE INVENTION

The invention relates to a signal light assembly having particular utility as a vehicular warning light, the lens of which is a unitary, rigid and transparent cover which is superposed upon a lamp housing, each of which is preferably circular in configuration. The lens protrudes from the housing to which it is attached, and interposed between the lens cover, housing and vehicle are plural sealing means which most effectively render the housing and a light soure mounted therein, impermeable to foul weather. The housing on which the lens is mounted is adapted to contain a sealed beam bulb which is secured in accordance with all S.A.E. photometric tests and standards. The lens cover is secured peripherally to the annulus of the housing such that the lens covers the housing in external and internal sealing contact.

DESCRIPTION OF THE DRAWINGS

FIG. 3 is a bottom plan view of the housing, a portion thereof being broken away to reveal the interior of the assembled lens cover.

FIG. 4 is a partial view in vertical section of the lens cover and housing assembly taken along section lines 4—4 of FIG. 1.

FIG. 5 is a view in partial perspective of a section of lens cover, unmounted.

DESCRIPTION OF THE PREFERRED EMBODIMENTS

Within this invention, the fresnel lens periphery of the assembly engages a conventional housing and seals in the following respects. There is on the lens a downwardly projecting, treble periphery, the outermost portion of which engages a corresponding annulus of the light housing and seals which are interposed between uppermost and lowermost annuli of the light housing, forming water-tight packing seals. These deformable seals which are set upon the supporting light housing are respectively engaged by opposed, concentric seal depressing skirts of the periphery of the lens cover, the two basic lens and housing components being brought into compressive contact by means of plural screw fasteners which anchor the lens cover to its supportive, warning light housing.

Figure 1:
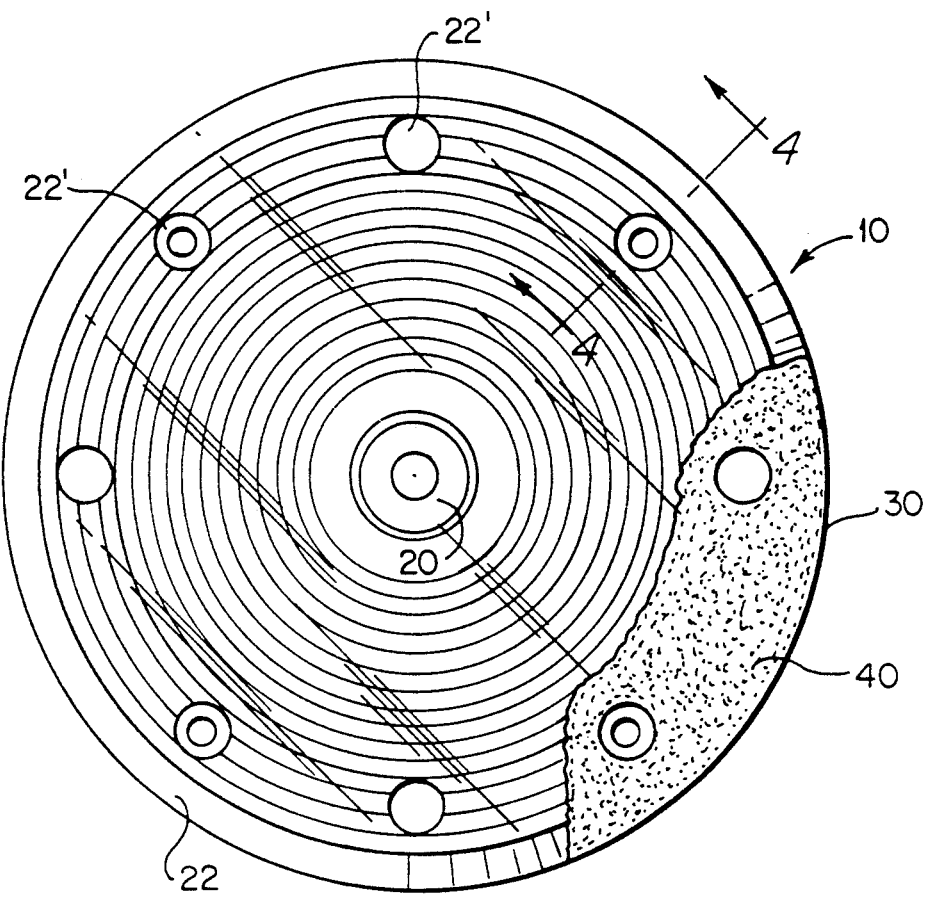
FIG. 1 is a top plan view of the lens cover, a portion being broken away to reveal an upper portion of the lamp housing to which the lens is attached.
Figure 2:
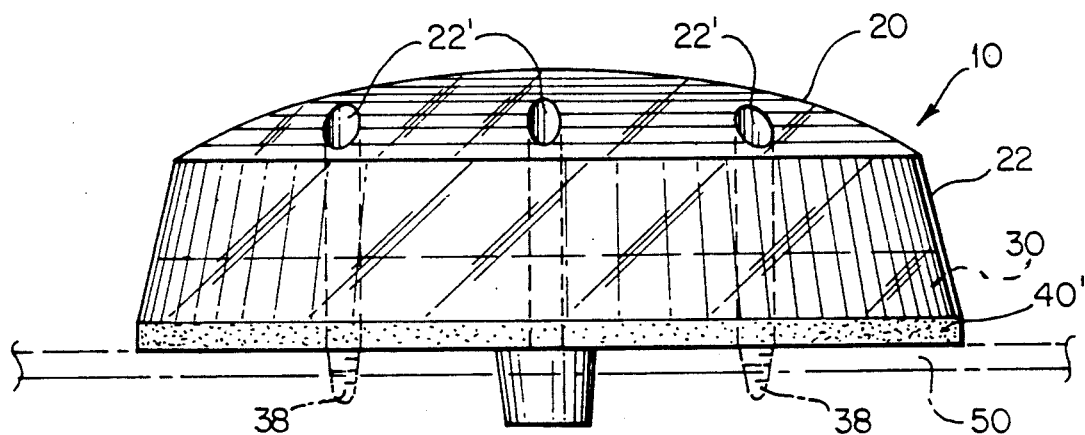
FIG. 2 is a view inside elevation of the lens cover mounted upon the housing, the housing being attached to the wall of a vehicle.

Referring more specifically to FIGS. 1 and 2, the lens assembly 10 is broadly represented by the drawings, wherein it is shown that the assembly includes the lens circular cover 20, appropriately mounted in overlapping relation to the circular housing 30 to which are adhered opposing peripheral seals 40-40'. As indicated in FIGS. 2 and 3, the lens cover is of convex circular configuration, having a fresnel reflective surface, interiorly thereof. Disposed, peripherally thereabout are anchor cavities 22', the cavities being located radially inward of lens skirt 22. These cavities 22' and fastener seats 22" are adapted to retain fastening means within the void 22'''. The outermost circular recess 24 of the lens cover encompasses a corresponding first annular projection 32 of housing 30, whereupon by tightening a screw fastening means, the cover 20 is depressed forcibly upon the housing 30, resulting in a compressive relationship as between respective lens cover 20 and housing 30. In general, the housing 30 will be semi-permanently mounted upon a vehicle such as a school bus, thereby making placement and/or replacement of the lens a simple function, the vehicle wall 50 presenting a fixed anchorage for the housing. This compressive relationship between the key elements results in a sealing as between the lowermost annuli of the lens cover 20 and the housing 30, whereby circular seals 40-40' located respectively on the top and bottom of the housing 30 provide a moisture impermeable block.

Referring particularly to FIG. 4 there is shown a significant interfit of lens skirt 22 relative to the annular projection 32 of housing 30. This outermost projection 32 seats firmly upward in circular recess 24 of the lens, presenting a circular rim lock against displacement of lens relative to housing. Recess 24 and concentric projection 24' of the lens, together with the connecting rim, compress and seal in part, the topmost seal between lens and housing. On the radially opposite side of lens recess 24, the circular projection 24" multiplies the sealing function of seal 40 on top of housing 30 and/or its fastener seat 34. The light and lens housing 30 is formed of a rigid plastic which not only presents annular projection 32, but also plural fastener seats 34, each projecting above the top surface of the light housing. Fasteners 36 are guided into registry by the channel 22", the latter having connection with expanded void 22''' of the lens. Once again, the lens is locked against displacement by the contact of housing seat 34 with the internal wall of lens void 22'''. An upper seal 40 is interposed between interior projections of the lens and the opposed surfaces of the housing, reference FIG. 4. A lower annular seal 40' is presented between the bottom of housing 30, the bottom of the lens and the wall 50 of the vehicle to which it is attached.

Whereas, the invention has been defined as including compression means in a multiple of four, it is desirable that the compression means including the housing fasteners, cover and housing cavities, may be provided through such a cavity as shown in FIG. 5 wherein the screw fastener penetrates to and through the body of the housing whereby to compress the cover and surrounding lens upon the lower seal 40'. The entire assembly, having either form of fasteners and receptor means, is supplementally sealed to the wall 50 of the vehicle by means of this flexible seal 40', the elongated 38 fasteners extending all the way through the surfaces of the light housing and penetrating through the wall of the vehicle.

Thus, there are two complemental means of sealing, on the one hand the lens and on the other hand the entire assembly, as indicated.

Whereas the invention has been defined with specific reference to its utility as a composite smooth lens and housing seal, applied primarily to school buses requiring warning lights there are various modifications to the invention, which may be made without departing from the spirit of the invention thereof as defined in the annexed claims. Moreover, although the light source has not been fully defined, the receptacle therefor and an appropriate ground are considered to be conventional within the meaning of the state-of-the-art.

We claim:

1. A smooth lens and housing assembly 10 for a warning light source, adapted to anchorage on a vehicle wall, comprising in interfitting relationship:

a) a flat circular housing 30 for a vehicular light source said housing forming an annular projection 32 thereon and plural fastener seats 34, which are concentrically disposed radially and inwardly of the projection 32, both the annular projection and the seats being integral parts of the housing;

b) a circular lens cover 20 superposed upon the housing 30, said lens cover defining an inwardly projecting skirt 22, with a circular recess 24 which fits into contiguous external overlapping relation with respect to the annular projection 32 of the housing; plural lens cover cavities 22' in circular array peripherally about the cover, said cavities passing through the lens cover and being parallel to a vertical axis of the assembly, at least one of said cavities 22' forming a lowermost expanded void 22'" encompassing and contacting at least one fastener seat 34 of the housing and at least one other of said cavities 22' providing a fastener channel to and through the housing;

c) a first compressible circular seal 40, interposed in inward extension of the housing 30, between the housing and lens cover 20 and a second compressible circular seal 40' set upon and in co-extension of the housing exterior, both seals 40-40' impinging upon the housing 30, compressing the seals 40-40' therebetween, securing the lens cover upon the housing and likewise securing the housing upon the vehicle wall in sealing relation thereto and in opposition to lateral displacement;

d) fasteners 36 engaging lens cover cavities 22' and housing 30 to seal them together and to seal both lens cover and housing to the vehicle wall.

2. The smooth lens cover and housing assembly of claim 1 wherein said housing 30 and lens cover 20 respectively define aligned fastener cavities adjacent the periphery of each said lens cover and housing, the cavities being in complemental array, relative to a centerline axis of the assembly.

* * * * *